Oct. 10, 1950     J. E. SHAFER     2,525,622
BEARING RETAINER
Filed Dec. 22, 1945
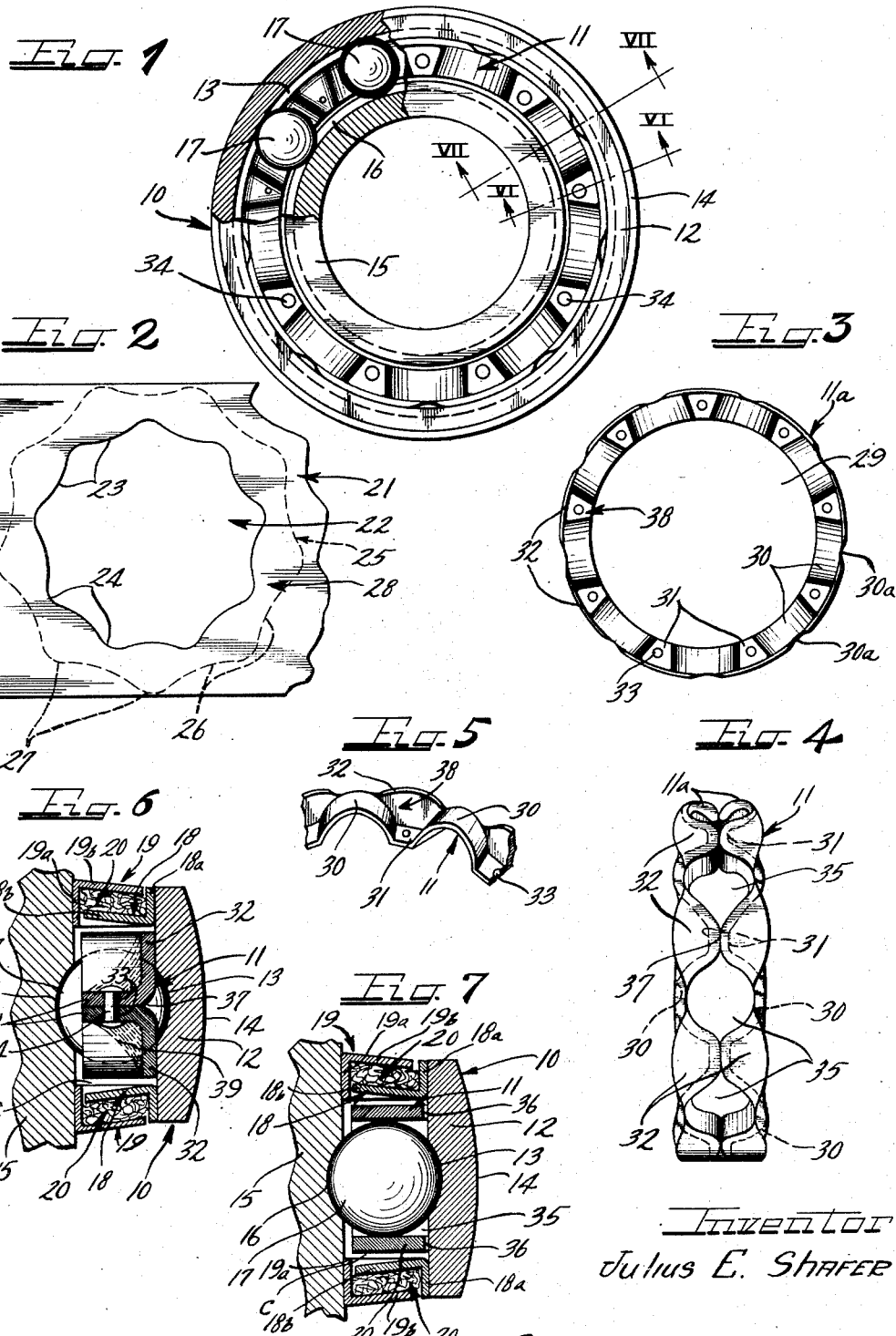
Inventor
Julius E. Shafer
by The Firm of Charles H. Hild Attys.

Patented Oct. 10, 1950

2,525,622

UNITED STATES PATENT OFFICE 2,525,622

BEARING RETAINER

Julius E. Shafer, Chicago, Ill.

Application December 22, 1945, Serial No. 636,806

4 Claims. (Cl. 308—201)

This invention relates to retainers for the anti-friction elements of bearing units and the like.

Specifically, this invention deals with a stamped sheet metal ball retainer or cage that rides on the outer race ring of a ball bearing unit entirely free of the inner race ring of the unit.

While the retainer of this invention is primarily intended for use in spacing the balls of a ball bearing unit, it should be understood that the invention is not limited to such usage, since the pockets of the retainer can be varied in shape to accommodate anti-friction elements other than balls. Therefore, although the invention will be hereinafter specifically described as embodied in a ball retainer or cage, it will be understood that the invention is not limited to the preferred described and illustrated embodiment.

According to this invention sheet metal stock such as brass is stamped and die-pressed to form identical rings having alternate pocket-forming bowed portions and flat webs extending radially outward around a central aperture. Integral flanges bridge the outer ends of adjacent bowed portions to overlie the spaces backed by the webs between the bowed portions. These flanges have segmental circular outer surfaces which form lands to carry the retainer unit on the outer race ring of a bearing. Portions of the outer ends of the bowed portions of the ring terminate radially inward of the land-forming outer surfaces to provide gaps for flow of lubricant between the ball pockets and the spaces between the bowed portions of the pockets. Two identical rings are secured together with their web faces in face-to-face relation. The bowed portions of each ring are thereby aligned to cooperate for forming open-ended cylindrical ball pockets. The webs can be secured together by riveting, spot-welding, or by any suitable attaching means. The lands of one ring are aligned with the lands of the other ring and, since the die-pressing operation does not form right angled corners on the metal, grooves will be provided between rounded surfaces which connect the webs with the flanges. These grooves are useful in transferring lubricant from pocket to pocket to equalize pressures created by lubricant in the respective pockets. Since the flanges overlie the spaces between the bowed portions of each ring, which spaces are backed by the flat webs, grease-retaining supply reservoirs are provided around the outer face of each ring adjacent each ball pocket. These reservoirs will feed lubricant to the ball pockets, or receive lubricant from the ball pockets, depending upon the pressure differential therebetween.

A feature of this invention resides in the provision the above-mentioned lubricant reservoirs which will hold grease in an unworked quiescent state until it is needed to lubricate the balls. Heretofore, any grease storage pockets provided by ball retainers have been at least partially defined by relatively movable surfaces and the grease therein has been continually subjected to shearing action during operation of the bearing. As a result, oil was worked out of the grease, leaving only an inefficient grease residue for feeding to the balls.

Another feature of this invention resides in the provision of an outer land-ridden ball retainer which is entirely free of the inner race ring of a bearing, and cannot bind on either the inner or outer race ring of the bearing.

A still further feature of this invention is to provide a ball retainer or cage for ball bearing units which is inexpensively formed from sheet metal stock by relatively simple stamping and die-pressing operations without stretching the metal or reducing the thickness thereof.

The ball retainers of this invention have the outer race ring-engaging lands or surfaces at spaced intervals around the retainer to eliminate the necessity for extreme accuracy in sizing the outer diameter of the stamping because some of the surfaces only need engage the outer race ring, while other surfaces can be slightly spaced from this outer race ring without interference with operating efficiency.

It is, then, an object of this invention to provide an outer land-ridden retainer for the anti-friction elements of bearing assemblies.

A further object of the invention is to provide an inexpensive stamped metal retainer or cage for anti-friction elements which will not bind in operation.

Another object of the invention is to provide a ball retainer having lubricant storage reservoirs which will not work lubricant stored therein, but which will automatically feed the lubricant to the balls retained thereby as the lubricant is needed.

A still further object of the invention is to provide an outer land-ridden ball retainer having a plurality of circumferentially spaced land surfaces.

A still further object of the invention is to provide a stamped metal ball retainer that is carried entirely by the outer race ring of a ball bearing and will never interfere with free operation of the balls in the bearings even though the bearing and retainer have widely variable tolerances.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of a ball bearing including a ball retainer according to this invention, and with parts broken away in vertical cross section to illustrate underlying parts.

Figure 2 is a plan view of a fragment of a metal strip illustrating the manner in which a blank for forming a retainer ring is cut according to this invention.

Figure 3 is a side elevational view of one of the stamped and die-pressed retainer rings formed from the strip metal blank shown in Figure 2.

Figure 4 is a peripheral plan view of the ball retainer of this invention.

Figure 5 is a fragmentary isometric view looking from the inside of one of the rings constituting the retainer of this invention.

Figure 6 is a transverse cross-sectional view taken along the line VI—VI of Figure 1 with bearing seals added.

Figure 7 is a transverse cross-sectional view taken along the line VII—VII of Figure 1 with bearing seals added.

As shown on the drawings:

As shown in Figures 1, 6, and 7, the reference numeral 10 designates generally a ball bearing unit equipped with a ball retainer 11 according to this invention. The unit 10 includes an outer race ring 12 with a groove 13 around the inner periphery thereof. The race ring 12 preferably has a transversely curved convex outer surface 14 for seating in a surrounding housing such as a pillow block (not shown) in tiltable relation.

The bearing 10 has an inner race ring 15 for receiving a shaft or the like (not shown) therethrough. The inner race ring 15 has a groove 16 around the circumference or outer periphery thereof. A row of balls 17 is disposed between the outer race ring 12 and the inner race ring 15. These balls ride on raceways provided by the grooves 13 and 16 to hold the race rings 12 and 15 in radially spaced apart relatively rotatable but axially fixed relation.

As best shown in Figures 6 and 7, a ball chamber C is provided between the rings 12 and 15. To prevent ingress of dirt or egress of lubricant from the ball chamber C, seals are usually provided between the inner and outer race rings of a bearing unit. As shown, these seals are composed of retainers 18 pressed into the outer race ring 12 on each side of the balls 17 and flingers 19 pressed onto the inner race ring 15 on each side of the row of balls together with a felt sealing ring 20 between each flinger and retainer. Each retainer 18 is a ring with a flat outer peripheral flange 18a sized for press-fit engagement with the inner periphery of the outer race ring 12. The flange 18a extends inwardly toward the row of balls 17 and has a radially inward and axially outwardly sloping flange 18b on the inner end thereof terminating in spaced relation from the inner race ring 15. Each flinger 19 includes a flat cylindrical base portion or inner flange 19a sized for press-fit engagement on the inner race ring 15. This base portion 19a is pressed onto the inner race ring 15 to extend under and beyond the inner terminal edge of the retainer flange 18b. A flinger flange 19b extends radially outward and slopes axially inward from the outer end of the base 19a to terminate adjacent the retainer flange 18a. The flanges 18b and 19b are in spaced apart parallel relation, and the sealing ring 20 is disposed in the space between these flanges, being preferably bonded to the retainer 19 and carried thereby in close-running clearance relationship with the retainer 18.

The ball chamber C is thereby closed by the seals on each side of the row of balls.

The retainer 11 is made from two identical rings 11a, 11a best shown in Figures 3 to 5. These rings 11a, 11a, as best shown in Figure 2, are readily formed from strip stock 21 by stamping and die-pressing operations. As shown in Figure 2, the strip stock 21, composed of brass or other suitable stamping material, is first apertured to provide a scalloped aperture 22 therein. This aperture 22 is defined by alternate inwardly extending arcuate projections 23 and outwardly extending recesses 24 to provide a somewhat concave-sided polygon with the number of sides thereof determined by the number of balls to be retained. Thus, a nine-sided polygon is illustrated for providing a retainer for nine balls. The apertured strip is then passed to a compound stamping and pressing die (not shown) which cuts the strip along the scalloped dotted line 25 to sever a ring-like blank therefrom and then immediately presses this blank into a ring 11a. As shown in Figure 2, the dotted line 25 has a scalloped contour with alternating arcuate depressions 26 and rounded projections 27 with each depression 26 bridging a recess 24 of the aperture 22 and with each projection 27 being radially aligned with the midpoint of the inwardly extending rounded portion 23 of the aperture 22. The flat ring 28 formed immediately prior to the die-pressing operation thus has scalloped inner and outer edges giving the ring a somewhat polygonal inner and outer contour with the outer polygon being offset from the inner polygon so that a side of the outer polygon spans adjacent portions of two sides of the inner polygon.

The forming or pressing die (not shown) acts on the flat blank 28 without stretching or reducing the thickness of the metal forming the original strip 21. The resulting ring 11a is therefore not unduly stressed and will not have weak spots formed by thin-walled sections. During the forming or die-pressing operation, the blank 28 is shaped by drawing and bending to the shape of the ring 11a shown in Figure 3 which has a continuous circular aperture 29. Alternate bowed portions 30 project radially from this aperture 29 and these bowed portions 30 are separated by flat web portions 31 which also extend radially from the aperture 29 between the bowed portions. Flanges 32 are turned back over the radial outer ends of the webs 31 and are integral with the bowed portions 30 to bridge the space between these portions and merge into the axially outward extending side sections of the bowed portions for rigidifying the bowed portions. As shown in Figure 4, these flanges 32 extend axially outwardly to the outer maximum width of the ring 11a and extend over the side edges of the bowed portions on opposite sides of the radially central and axially outermost sections of the bowed portions so as to terminate axially inward of these sections leaving them uncovered. Further the outer edges of the radial mid-sections of the bowed portions 30 are slightly convex to provide recesses 30a which are of maximum depth at the radial mid-points of the bowed portions 30. Thus the flanges 32 are scalloped as shown in Figures 4 and 5 and the outer edges of the ball pockets are uncovered and recessed at their mid-sections. As illustrated in Fig. 3, the webs 31 have rivet-receiving apertures 33 punched therethrough about midway between their inner edges and the flanges 32.

The retainer 11 of this invention has a ring 11a thereof inserted between the bearing rings 12 and 15 on each side of the row of balls 17. The two rings 11a, 11a are then brought together with the balls disposed in the bowed portions 30 and with the webs 31 thereof in face-to-face engagement as shown in Figure 6. The rings are secured in this position by rivets such as 34 passed through the apertures 33 through the webs 31. The resulting retainer 11 thus has radially extending cylindrical pockets 35 best shown in Figures 4 and 7 receiving the balls 17 therein and having bearing contact with the great circle of the balls. The outer edges of the bowed portions 30 defining the pockets 35, as explained above, are concave as at 30a to leave gaps 36 shown in Figure 7 between the outer race ring 12 and the retainer. These gaps 36 connect the pockets 35 with the bearing chamber C outside of the retainer.

The flanges 32, as shown in Figures 4 and 6, have segmental circular outer faces providing lands which ride on the outer race ring 12. Since these lands are spaced apart by the concave edges 30a of the pocket-defining bowed portions 30, the retainer will have bearing engagement with the outer race 12 at a plurality of spaced areas around the circumference thereof. It is not necessary that all of these lands engage the outer race ring 12 and therefore appreciable tolerance allowances can be permitted without sacrificing operating efficiency.

Since, as explained above, the flanges 32 are connected through rounded corners with the webs 31, each pair of opposed flanges 32 cooperates at the inner edges thereof to define grooves 37 connecting the pockets 35 so that grease can flow between the pockets to equalize lubricant pressures in the pockets.

The aperture 29 through the rings 11a forming the retainer 11 is of larger diameter than the major diameter of the inner race ring 15, so that the retainer 11 is spaced radially outward from the inner race ring 15 and is always entirely free of this inner race ring, as shown in Figures 6 and 7.

As best shown in Figures 3, 5 and 6, spaces 38 are provided between the bowed portions 30 and these space 38 are bounded on the sides by the bowed portions 30, on the back by the webs 31, and on the top by flanges 32. The spaces 38 provide lubricant reservoirs for receiving excess grease from the ball pockets 35 and for feeding grease back to the ball pockets when needed therein. The grease in the reservoirs or spaces 38 is retained therein without being worked or subjected to shearing action during operation of the bearing because the spaces are self-contained pockets defined by surfaces which do not move relative to each other.

Sealed bearing units equipped with retainers according to this invention have the bearing chambers C thereof charged with lubricant such as grease. During operation of the bearing, excess lubricant will work out of the ball pockets 35 through the gaps 36 to be received in the spaces or reservoirs 38. Centrifugal action on the grease in these reservoirs 38 will cause the inner face of the grease to assume contours as illustrated at 39 in Figure 6. Centrifugal force tends to throw the grease against the flanges 32. When the grease content of the ball pockets 35 diminishes, the rotating balls create somewhat of a suction action through the gaps 36 and the centrifugal force on the grease in the spaces 38 cooperates with the reduced pressure effect in the ball pockets 35 to cause grease to flow from the spaces through the gaps 36 into the pockets 35 for lubricating the balls. Some of this grease will flow through the grooves 37 to form lubricating films on the land-forming outer surfaces of the flanges 38 to lubricate the retainer. Grease that works through the inner aperture 29 of the retainer is thrown by centrifugal force off of the inner edges of the flinger bases 19a to be deposited in the spaces 38.

From the above descriptions it will be clear that this invention provides an inexpensive stamped metal outer land-ridden retainer for anti-friction elements which cooperates with the race rings and seals of a sealed bearing unit to efficiently store lubricant in an unworked condition until it is needed and then feeds the lubricant to the parts in bearing contact.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A ball retainer for the balls of a bearing having inner and outer race rings which comprises two rings, each ring having alternate pocket forming bowed portions and flat webs extending radially outward around a central aperture of larger diameter than the inner race ring of the bearing, each ring having integral flanges connecting the radially outer ends of the sides of adjacent bowed portions inwardly of the axially outermost sections of these portions and overlying spaces back by the webs between the bowed portions, said flanges having segmental circular outer surfaces forming lands for riding on the inner surface of the radially outer race ring, portions of the outer ends of said bowed portions of the ring radially inward of said land-forming outer surfaces to provide gaps between the retainer and outer race ring for flow of lubricant between the pockets and said spaces between the bowed portions, and means securing said two rings together with the flat webs thereof in face-to-face engagement and with the bowed portions thereof surrounding the balls of the bearing.

2. An outer land ridden container for the anti-friction elements of a bearing having inner and outer race rings with anti-friction elements therebetween which comprises a cage ring having axially outward extending arcuate rim flanges at spaced intervals around the periphery thereof for riding on the outer race ring and having radially extending open-ended pockets for receiving anti-friction elements, said flanges cooperating with the outer faces of the ring to define lubricant reservoirs, and the radially outer edges of said pockets being recessed to provide gaps for flow of lubricant between the pockets and reservoirs.

3. A ball cage for ball bearing units which comprises two rings each having radially extending bowed portions alternating with radially extending flat web portions together with integral flanges spanning the spaces between the bowed portions and merging with the web portions along rounded surfaces, means uniting the web portions together in face-to-face relation to position the bowed portions of the respective rings in opposed relation for cooperating to define radially extending open ended cylindrical ball pockets communicating around the rings through grooves provided by the rounded surfaces connecting the flanges and webs, said flanges forming spaced contact areas for riding on the outer race ring of a ball bearing to carry the cage entirely free of the inner race ring of the bearing, said flanges also cooperating with the side faces of the cage to provide lubricant reservoirs at spaced intervals around the cage between the pockets, and said bowed portions having recessed outer edges cooperating with the outer race ring of the bearing to provide gaps for flow of lubricant between the reservoirs and pockets.

4. A ball cage adapted for ball bearing units which comprises two rings each having radially extending axially outward bowed portions alternating with radially extending flat web portions at the axial inner ends of the bowed portions, axially outward extending integral peripheral flanges connecting the radially outer ends of the sides of adjacent bowed portions inwardly of the axially outermost sections of these portions and merging with the flat web portions along rounded surfaces, means uniting the web portions together in face to face relation to position the bowed portions of the rings in opposed relation for defining radially extending open ended cylindrical ball pockets communicating around the outer periphery of the assembly through grooves provided by the rounded surfaces connecting the flanges and webs, said flanges terminating axially inward of the axially outermost portions of the ball pockets and overlying spaces backed by the flat webs between the bowed portions to form with their inner faces lubricant retaining walls and to form with their outer faces spaced contact areas for riding on the outer race ring of a ball bearing to carry the cage entirely free of the inner race ring of the bearing, and said axially outermost outer ends of the ball pockets being recessed radially inward between the flanges to provide gaps for flow of lubricant from under the flanges to the pockets.

JULIUS E. SHAFER.

REFERENCES CITED

The following references are of record in the file of this patent:

UNITED STATES PATENTS

| Number | Name | Date |
|---|---|---|
| 1,742,418 | Schubert | Jan. 7, 1930 |
| 1,804,110 | Parsons | May 5, 1931 |
| 1,857,823 | Robinson | May 10, 1932 |

FOREIGN PATENTS

| Number | Country | Date |
|---|---|---|
| 15,348 | Great Britain | 1908 |
| 313,565 | Great Britain | May 8, 1930 |